Figure 1:
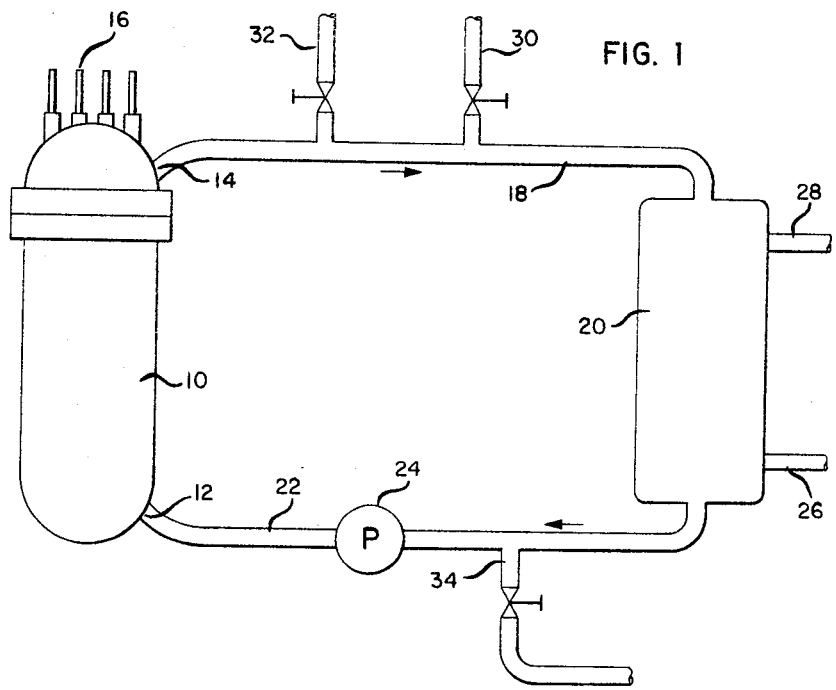

Sept. 6, 1966  S. VISNER  3,271,261

ORGANIC MODERATED NUCLEAR REACTOR AND CONTROL METHOD THEREFOR

Filed Dec. 27, 1963

INVENTOR.
SIDNEY VISNER

BY Eldon H. Luther

United States Patent Office 3,271,261
Patented Sept. 6, 1966

3,271,261
ORGANIC MODERATED NUCLEAR REACTOR
AND CONTROL METHOD THEREFOR
Sidney Visner, West Hartford, Conn., assignor to Combustion Engineering, Inc., Windsor, Conn., a corporation of Delaware
Filed Dec. 27, 1963, Ser. No. 333,884
13 Claims. (Cl. 176—20)

This invention relates to nuclear reactors and more particularly to a method and apparatus for operating and controlling a thermal reactor in which there is both fissionable and fertile material.

A nuclear reactor requires a specific amount of fissionable material referred to as the critical mass in order to sustain a chain reaction. At the point of criticality the neutron production by fission is exactly balanced by the neutron leakage and absorption. As the fissionable material is consumed and converted into fission products, the reactor will reach a point at which it is no longer critical, that is, the chain reaction will no longer be sustained. At this point the reactor must be shut down and the fuel re-processed.

The economical operation of a nuclear reactor requires that there initially be a substantial excess of fissionable material so that the reactor can be operated for a reasonable period of time before it becomes necessary to replenish the fuel. When there is an excess of fissionable material there will also be an excess of neutrons above that necessary to merely sustain the chain reaction. This condition exists when the effective multiplication factor, $k_{eff}$, is greater than 1. The factor $k_{eff}$ is defined as the ratio of the average number of neutrons produced by fission in each generation to the total number absorbed by fuel, moderator, etc., or leaking out. If $k_{eff}$ is greater than 1, the system is divergent and will go out of control if allowed to remain in that condition.

The maintenance of a controlled chain reaction requires that these excess neutrons be absorbed or undergo non-fission capture or that they be allowed to escape from the reactor. Existing control methods include the addition or removal of fuel, moderator, reflector material or a neutron absorber. This includes the use of control rods and burnable poisons as well as a system wherein the amount of fuel in the core is varied such as in a homogeneous reactor.

The critical mass of a thermal reactor is dependent upon the energy spectrum of the neutrons. The critical mass decreases as the number of neutrons possessing thermal energy is increased since fission in a thermal reactor is primarily caused by neutrons possessing thermal energies. Thermal neutrons are those having an amount of energy such that they are in thermal equilibrium with the surrounding material. The specific energy is thus dependent upon the temperature. It can thus be seen that at the beginning of life when the amount of fissionable material and therefore excess neutrons is greatest, control can be realized by reducing the moderating capabilities of the reactor which will have the effect of producing fewer thermal neutrons. As time elapses and the amount of fissionable material decreases, the amount of moderation can be increased to provide additional slowing down power and thus additional thermal neutrons to sustain the reaction. This control method is embodied in the present invention in a novel manner.

An object of the present invention is to provide a novel nuclear reactor and control method therefor.

A further object of the present invention is to provide a nuclear reactor employing a novel moderator for the purpose of control.

It is also an object of the present invention to provide a method of control for a power-breeder reactor.

A more specific object of the present invention is to provide a nuclear reactor with an organic moderator which can have its moderating capabilities varied to effect control of the reactivity.

Figure 2:
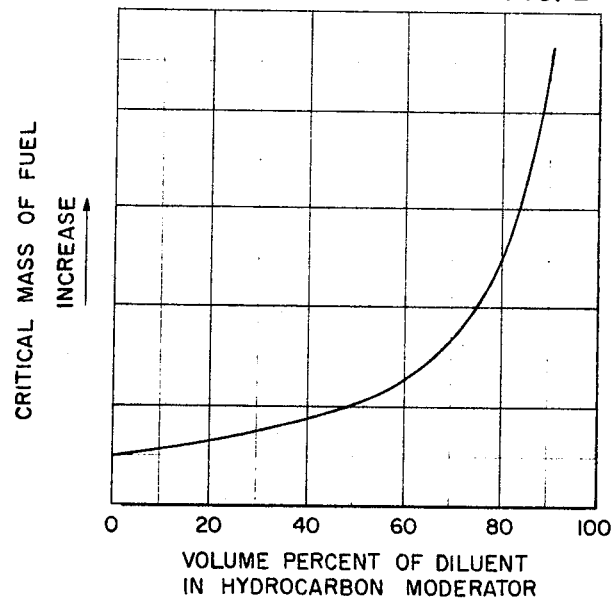

Other objects and advantages will become apparent from the following description of the invention when read in conjunction with the accompanying drawings wherein:

FIG. 1 is a schematic diagram of a reactor system operated in accordance with the present invention; and FIG. 2 is a graph illustrating the change in critical mass as a function of the change in moderator.

The U.S. Patent 3,081,246 of Edlund issued March 12, 1963, describes a nuclear reactor and control method therefor wherein water serves as the primary coolant and moderator. Control of the reactor is achieved by varying the relative proportions of light and heavy water in the moderator-coolant mixture. Various materials differ in their ability to reduce the energy of a neutron upon collision. The lower the mass number of the atoms in the material the better the material is as a moderator as long as it will not absorb neutrons to any appreciable extent. Deuterium has a higher mass number than hydrogen and thus its slowing down power is less. Therefore by regulating the proportion of light and heavy water the reactor can be controlled.

An additional feature of the control method embodied in the present invention makes use of the fact that fast neutrons in a reactor can undergo resonance capture by fertile material such as U-238 or Th-232 to produce fissionable materials. The advantages of using the excess neutrons to convert the fertile material to fissionable material instead of having them undergo non-productive capture are readily apparent. The higher the conversion ratio (number of new fissionable nuclei produced for each such nucleus consumed) the lower the net depletion rate of the fuel and the longer a reactor of any given size can be operated before refueling is necessary. Thus at the beginning of life when the moderating effect is reduced, the excess neutrons are fast neutrons possessing fission energy and contributing to the conversion of fertile material. As the reactor ages the moderating capability is increased to maintain criticality.

The present invention involves the control of an organic cooled and organic moderated reactor by varying the moderating capabilities of the organic coolant-moderator. Nuclear reactors employing organic moderators and coolants are well known in the art. For example, a reactor employing diphenyl as a moderator is disclosed in the U.S. Patent 2,708,656 issued May 17, 1955 to E. Fermi et al. Mixtures of diphenyl and terphenyl have been utilized in the OMRE (Organic Moderated Reactor Experiment) cf. "Details of OMRE" Nucleonics, volume 14, No. 5, page 22, May 1956. Monsanto Chemical Company produces a group of organics under the trademark "Santowax OMP" comprising a mixture of ortho, meta and para terphenyls with small amounts of diphenyl and higher boilers. These mixtures are well suited to use in organic cooled and moderated reactors since they have a favorable melting and boiling point, are relatively non-corrosive and are relatively stable when subjected to radiation. A comprehensive listing of suitable phenyl compounds can be found in the Ort et al. Patent 3,063,927 issued November 13, 1962.

According to the present invention the slowing down or moderating power of the organic moderator must be changed during the life of the reactor. The moderating power of an organic moderator is provided primarily by the hydrogen in the organic. To vary the moderating power the amount of hydrogen must therefore be changed and this is accomplished by diluting or replacing some of the original hydrocarbon moderator with materials having less hydrogen. The diluent material must be miscible with the original hydrocarbon, must be relatively non-corrosive and must be relatively stable when subjected to radiation. There are many substituted hydrocarbons which could be employed but a preferred material is the fluorocarbons. They are particularly well suited to use in the moderator since they are in general miscible, non-corrosive and quite stable with respect to radiation. Also the fluorocarbons have a very low absorption cross section with respect to thermal neutrons. For these reasons, they would be excellent organic moderators in place of the hydrocarbons but they have such a large neutron age that the critical size of the reactor would be prohibitive. However, the advantages of the fluorocarbons are realized to some extent in the present invention when they are employed as the diluent. Other halogenated hydrocarbons would be suitable, however, they have a much higher absorption cross section and thus are not as desirable as the fluorocarbons. One suitable diluent is deca fluorodiphenyl the preparation of which is described by W. J. Pummer and L. A. Wall in the Journal of Research of the National Bureau of Standards, volume 63A, 167–9 (1959). The preparation of this material is also disclosed in U.S. Patent No. 3,000,976 issued on Sept. 19, 1961 to Patrick et al. and in U.S. Patent No. 3,046,313 issued July 24, 1962 to Pummer et al.

Other materials which could be employed such as the fluorocarbon analogs of benzene, naphthalene and terphenyl are discussed in the U.S. Atomic Energy Commission, Division of Technical Information Report TID 7622, pages 109–120, issued July 1962. This report lists Imperial Smelting, Ltd., of Avonmouth, England, as a commercial source for some of these materials.

In addition to the chemical variants mentioned above, isotopic variants such as deuterated hydrocarbons wherein the hydrogen has been replaced by deuterium may be employed as a diluent. The synthesis of deuterated biphenyls is described in the Journal of Organic Chemistry, volume 26, pages 243–245 (1961).

At the beginning of life a nuclear reactor operated in accordance with the present invention would have a large proportion of diluent in the moderator, i.e., a large proportion of fluorocarbon in a hydrocarbon moderator. Since the ability of the moderator to reduce the energy of the neutrons is reduced, the average energy of the neutrons will be high. The amount of fluorocarbon will be adjusted such that just enough thermal neutrons are produced to sustain the reaction. The large excess of neutrons will therefore possess high energy and they will readily undergo capture in the fertile material in the core to produce fissionable material. As time passes and the amount of fissionable material is reduced and more thermal neutrons are necessary to maintain the chain reaction the amount of fluorocarbon or other diluent will be decreased to increase the moderating power and provide more thermal neutrons. At this stage there will be fewer fast neutrons to contribute to conversion of fertile material.

A system operated in accordance with the present invention is illustrated in FIG. 1 wherein the nuclear reactor 10 has primary coolant inlet 12 and outlet 14 and control rods 16. The reactor is of the conventional heterogeneous type having a core containing both fissionable and fertile material arranged in a distinct form. The primary coolant flows from the reactor via conduit 18 to the heat exchange unit 20. The primary coolant after flowing through the heat exchange unit is returned to the reactor via conduit 22 to complete the circuit. A pump 24 in the circuit induces and controls the flow. The heat is extracted from the primary coolant in the heat exchange unit by means of boiling water. The water enters the heat exchange unit through line 26 and the steam leaves through line 28. The primary coolant comprises a mixture of a hydrocarbon such as terphenyl and a moderator diluent such as deca fluorodiphenyl. The valve line 30 is employed to introduce hydrocarbon into the system while the valved line 32 is employed to introduce the diluent. When it is desired to increase the proportion of hydrocarbon, some of the moderator mixture is withdrawn through valved line 34 and the replacement hydrocarbon is introduced via line 30.

The graph of FIG. 2 illustrates how the critical mass of a reactor is reduced as the amount of diluent in the hydrocarbon moderator is reduced. Thus, as the amount of fissionable material available is reduced due to burn-up, the amount of diluent would be reduced in accordance with the curve to maintain the reactor in a critical condition.

An organic moderated and cooled nuclear reactor has two distinct advantages over water cooled and moderated reactors. For the same temperature of coolant a lower pressure is produced in the organic system making the construction problems much simpler. Or, on the other hand, a higher temperature can be maintained for similarly constructed units. Another advantage is that the organics are not as corrosive as the water and thus cheaper materials of construction can be used such as carbon steels instead of stainless steel. The fluorocarbons are extremely chemically stable and thus even less corrosive than the hydrocarbons. Therefore, when a fluorocarbon is used as the diluent the additional benefit of decreased corrosion is realized as well as the control feature.

One problem encountered in organic moderated and cooled systems is that the organics are unstable when subjected to radiation and undesirable reactions occur increasing the viscosity and molecular weight of the moderator. Therefore, either periodic or continuous replacement is necessary. In a system operated in accordance with the present invention, as the mixture of a hydrocarbon and diluent is removed via line 34 for disposal or re-processing, the pure hydrocarbon is introduced via line 30 so that the replenishing of the spent moderator is accomplished at the same time that the moderating capabilities of the moderator are being increased.

Another advantage of an organic system over a water system is that there is less change in moderator density from the cold startup condition to the hot operating condition. With a water moderator there is a reduction in moderator density of about 26 percent from cold to hot condition. This results in a reactivity loss of 8 percent $\Delta k/k$ at the end of life when the coolant is practically all light water. At the begining of life when there is a large percentage of heavy water the reactivity change would be even greater. This large reactivity change requires the use of a sizable number of control rods or a large quantity of poison. In the organic system, however, the change in density from cold to hot condition is only about 15 percent and the reactivity change is only 3 or 4 percent. Therefore, fewer control rods would be necessary in an organic reactor operated in accordance with the present invention than with a water moderated reactor employing heavy water as a diluent.

While one preferred embodiment of the invention has been shown and described, it will be understood that such showing is illustrative rather than restrictive and that changes in construction and steps may be made without departing from the spirit and scope of the invention as claimed.

I claim:

1. A nuclear reactor comprising a quantity of a fissionable material, a quantity of moderator proximate to said fissionable material, said moderator comprising a hydrocarbon and a fluoronated polyphenyl, and means for regulating the ratio of said hydrocarbon to said fluoronated polyphenyl during operation to maintain criticality.

2. A nuclear reactor as claimed in claim 1 and further including a quantity of fertile material proximate to said fissionable material.

3. A nuclear reactor comprising a quantity of fissionable material, a quantity of moderator proximate to said fissionable material, said moderator comprising a hydrocarbon and a fluoronated diphenyl, and means for regulating the ratio of said hydrocarbon to said fluoronated diphenyl during operation to maintain criticality.

4. A nuclear reactor as claimed in claim 3 and further including a quantity of fertile material proximate to said fissionable material.

5. A method of controlling a hydrocarbon moderated nuclear reactor comprising the steps of diluting said hydrocarbon moderator with a quantity of fluoronated polyphenyl such that said reactor is just critical, increasing the ratio of hydrocarbon to fluoronated polyphenyl during operation of said reactor to increase the moderating capabilities and maintain criticality.

6. A method of controlling a hydrocarbon moderated nuclear reactor comprising the steps of diluting said hydrocarbon moderator with a quantity of a fluorocarbon such that said reactor is just critical, increasing the ratio of hydrocarbon to fluorocarbon during operation of said reactor to increase the moderating capabilities and maintain criticality.

7. A method of controlling a hydrocarbon moderated nuclear reactor comprising the steps of diluting said hydrocarbon moderator with a quantity of a deca-fluorodiphenyl such that said reactor is just critical, increasing the ratio of hydrocarbon to deca-fluorodiphenyl during operation of said reactor to increase the moderating capabilities and maintain criticality.

8. A method of controlling a nuclear reactor having a polyphenyl moderator comprising the steps of diluting said polyphenyl moderator with a quantity of fluoronated polyphenyl such that said reactor is just critical, increasing the ratio of polyphenyl moderator to said fluoronated polyphenyl during operation of said reactor to increase the moderating capabilities and maintain criticality.

9. The method of claim 8 wherein said fluoronated polyphenyl comprises at least in part deca-fluorodiphenyl.

10. A nuclear reactor comprising a quantity of fissionable material, a quantity of moderator proximate to said fissionable material, said moderator comprising a hydrocarbon and a fluorocarbon and means for regulating the ratio of said hydrocarbon to said fluorocarbon during operation to maintain criticality.

11. A nuclear reactor as claimed in claim 10 wherein said fluorocarbon comprises at least in part deca-fluorodiphenyl.

12. A nuclear reactor comprising a quantity of fissionable material, a quantity of moderator proximate to said fissionable material, said moderator comprising a polyphenyl material and a fluoronated polyphenyl material, and means for regulating the ratio of said polyphenyl material to said fluoronated polyphenyl material during operation to maintain criticality.

13. A nuclear reactor as in claim 12 wherein said fluoronated polyphenyl material comprises at least in part deca-fluorodiphenyl.

References Cited by the Examiner

UNITED STATES PATENTS 3,113,916 12/1963 Abbott _____ 176—92.1
3,142,624 7/1964 Edlund _____ 176—42

FOREIGN PATENTS 749,064 5/1956 Great Britain.

OTHER REFERENCES

Directory of Nuclear Reactors, vol. 2, pp. 343–348, publ. by IAEA in 1959.

Williams etal. 2nd Geneva Conf., 1958, vol. 12, pp. 518–524, publ. by U.N.

REUBEN EPSTEIN, *Primary Examiner.*

CARL D. QUARFORTH, *Examiner.*

M. R. DINNIN, *Assistant Examiner.*